(12) United States Patent
Furuya et al.

(10) Patent No.: US 6,342,739 B1
(45) Date of Patent: Jan. 29, 2002

(54) SMALL-SIZED MOTOR AND METHOD OF MANUFACTURING THE SAME

(75) Inventors: Kenji Furuya; Toshiya Yui, both of Matsudo (JP)

(73) Assignee: Mabuchi Motor Co., Ltd. (JP)

(*) Notice: Subject to any disclaimer, the term of this patent is extended or adjusted under 35 U.S.C. 154(b) by 0 days.

(21) Appl. No.: 09/537,328

(22) Filed: Mar. 29, 2000

(30) Foreign Application Priority Data

Mar. 30, 1999 (JP) ............................................. 11-087822

(51) Int. Cl.[7] ................................................ H02K 7/00
(52) U.S. Cl. ..................... 310/40 MM; 310/90; 310/89; 384/204
(58) Field of Search ............................ 310/40 MM, 90, 310/91, 89; 384/192, 195, 202, 210, 135, 204; 417/423.12; 29/596, 598

(56) References Cited

U.S. PATENT DOCUMENTS

| | | | | |
|---|---|---|---|---|
| 5,207,515 A | * | 5/1993 | Weissgerber et al. | 384/516 |
| 5,267,797 A | * | 12/1993 | Brandt | 384/275 |
| 5,688,054 A | * | 11/1997 | Rabe | 384/295 |
| 5,895,207 A | * | 4/1999 | Burgdorf et al. | 417/410.1 |
| 5,945,756 A | * | 8/1999 | Peiryathamby et al. | 310/89 |
| 6,008,557 A | * | 12/1999 | Dornhoefer et al. | 310/90 |
| 6,171,079 B1 | * | 1/2001 | Gross et al. | 417/423.12 |
| 6,179,468 B1 | * | 1/2001 | Thorstens et al. | 384/40 |
| 6,225,720 B1 | * | 5/2001 | Desta | 310/90 |
| 6,252,321 B1 | * | 6/2001 | Fisher et al. | 310/89 |

FOREIGN PATENT DOCUMENTS

JP 3-234915 10/1991

* cited by examiner

*Primary Examiner*—Nestor Ramirez
*Assistant Examiner*—Thanh Lam
(74) *Attorney, Agent, or Firm*—McGlew and Tuttle, P.C.

(57) ABSTRACT

A bearing 4 is accommodated within a cylindrical bearing support portion 2 projecting from an end surface of a motor casing 1 made of a metal. The bearing 4 has an outer diameter smaller than the inner diameter of the bearing support portion 2 such that a clearance is formed between the bearing 4 and the bearing support portion 2. At an approximate center of the bearing 4 with respect to the thrust direction, a projection 19 is continuously or non-continuously formed on the inner circumferential surface of the bearing support portion 2 along a circular line centered on the motor shaft. Further, a depression 20 corresponding to the projection 19 is continuously or non-continuously formed on the outer circumferential surface of the bearing 4 along the circular line. Thus, the bearing 4 is supported within the bearing support portion 2 in such a manner that thrust movement is prevented, but slight tilting about the projection 19 is permitted. Therefore, run-out of a rotor and generation of noise do not occur even when the perpendicularity of the bearing and the bush relative to the motor shaft deteriorates slightly.

6 Claims, 7 Drawing Sheets

SMALL-SIZED MOTOR AND METHOD OF MANUFACTURING THE SAME

TECHNICAL FIELD

The present invention relates to a bearing fixing structure for a small-sized motor used as a drive motor in automotive-use electrical equipment, power tools, or the like, as well as to a method of manufacturing the same.

BACKGROUND ART

A conventional small-sized motor has an overall structure as shown in FIG. 6 (see Japanese Patent Application Laid-Open (kokai) No. 3-234915). Permanent magnets 15 serving as stator magnet poles (generally, two poles) are attached to the inner surface of a motor casing 1, which is formed of a metallic material into a closed-bottomed cylindrical shape. A cylindrical projection for receiving a bearing 4 (slide bearing) is provided at the center of the bottom portion of the motor casing 1. A casing cover 8 is fitted into the opening of the motor casing 1. A projection for receiving a bearing 12 (slide bearing) is provided at the center of the casing cover 8. Brushes 11 and terminals 9 connected thereto are provided on the casing cover 8. A core 13, a winding 14, and a commutator 10 are attached to a motor shaft 5 to constitute a rotor 16.

Such a small-sized motor is assembled in the following manner. After one end of the motor shaft 5 of the rotor is inserted in the bearing 4 fitted into the center of the bottom portion of the motor casing 1, the casing cover 8 carrying the brushes 11 and the terminals 9 is fitted into the opening of the motor casing 1, while the other end of the motor shaft 5 is inserted into the bearing 12 fixed to the casing cover 8. During the assembly, a bush 17 fixed to the motor shaft 5 positions the rotor 16 in the thrust direction (axial direction).

Such a small-sized motor sometimes encounters the problem of generation of mechanical vibration caused by a clearance between the motor shaft and the bearings. The applicant of the present application has proposed means for solving the problem of vibration generation, in the above-described Japanese Patent Application Laid-Open No. 3-234915. The proposed means will be described with reference to FIGS. 7(A) and 7(B).

FIG. 7(A) shows a state in which the bearing 4 is press-fitted into a bearing support portion 2, which is integral with the motor casing 1. In this state, a relatively large clearance remains between the motor shaft 5 and the bearing 4, because of limitations in mechanical machining. As shown in FIG. 7(B), the clearance can be reduced forcedly through an operation of pressing the entirety of the outer circumferential surface of the bearing support portion 2 by use of a pressing jig 6. When the bearing support portion 2 is pressed, the inner circumferential surface of the bearing 4 comes into contact with the motor shaft 5. However, when the pressing jig 6 is moved, the bearing 4 produces a restoration force, so that a fine clearance necessary for rotation of the motor shaft is formed.

The above-described measure solves the problems caused by a radial clearance between the motor shaft and the bearing. However, the measure can solve neither a problem which arises when the perpendicularity of the bearing 4 and the bush 17 relative to the motor shaft deteriorates nor a problem which arises when the alignment between two bearings at the opposite ends of the motor shaft becomes incorrect. Further, the measure cannot decrease neither the clearance between the bearing and the bush or the end play with ease.

FIG. 8 shows an example bearing structure which can be used as the bearing 4 of the conventional small-sized motor shown in FIG. 6. FIG. 8 shows a lower half of a cross section taken along the center of the motor shaft 5. In FIG. 8, reference numeral 2 denotes a cylindrical bearing support portion which is integrally formed with the metal motor casing 1 to be located at the center of the bottom portion and which is adapted to support the bearing 4. Since the bearing 4 is press-fitted into the interior of the bearing support portion 2, no clearance is formed between the outer circumferential surface of the bearing 4 and the inner circumferential surface of the bearing support portion 2, and therefore the bearing 4 cannot move in the thrust direction relative to the bearing support portion 2. Movement of the motor shaft 5 in the thrust direction is restricted by means of the bush 17 fixed to the motor shaft 5.

As shown in FIGS. 9(A) and 9(B), the perpendicularity of the contact surface of the bearing 4 and the bush 17 relative to the motor shaft may deteriorate slightly due to insufficient precision arising in parts and assembly. FIG. 9(B) shows a state in which the rotor rotates by 180 degrees from the position shown in FIG. 9(A). When the end surface of the bush 17 in contact with an end surface of the bearing 4 cannot maintain a desired level of perpendicularity relative to the motor shaft, the rotor causes run-out, resulting in generation of noise.

Conventionally, the above-described problem is overcome through employment of a measure such that thrust movement of the motor shaft is absorbed by use of a wave washer or the like, or the end play (gap that allows thrust movement of the motor shaft) is reduced. However, use of a wave washer results in an increase in the number of parts, which increases cost. Further, in order to decrease the end play, the dimensional tolerance of each part must be decreased considerably. When the dimensional tolerance is set to a very small value, parts which fail the tolerance are often produced, resulting in an increase in cost. Alternatively, an adjustment washer or washers are provided for at least one of the two bearings, and the thickness of the washer (in the case of a single washer being used) or the number of washers (in the case of plural washers being used) is adjusted in order to reduce the end play. However, this method increases the number of fabrication steps, and is therefore not efficient.

Further, in order to cope with deterioration in the alignment between two bearing at the opposite ends of the motor shaft, it becomes necessary to increase the clearance between the motor shaft and the bearing or to taper the inner surface of the bearing to thereby provide play. However, in this case, when the alignment has not deteriorated, the motor shaft hits the bearing in the radial direction, resulting in generation of noise.

The problems involved in conventional techniques have been described with reference to exemplary cases in which "slide bearings" are used as bearings. However, the same problems arise in cases in which "ball bearings" are used. FIG. 15 is a partially sectioned side view of a conventional small-sized motor using ball bearings with the rotor and casing cover being removed. FIG. 16 is a view of the small-sized motor as viewed from the interior of the motor toward the bearing portion. In general, a slight clearance is provided outside a ball bearing 3. In addition, for fixation of the ball bearing 3, a bearing attachment 30 is used in order to eliminate the end play of the motor.

However, since fixation of the bearing attachment 30 carrying the ball bearing 3 is performed through caulking of caulking portions 31 formed integrally with the attachment 30, the bearing attachment 30 itself must be formed to have a relatively large volume and a complicated shape, resulting in an increase in cost.

DISCLOSURE OF THE INVENTION

An object of the present invention is to provide a bearing fixing structure for a small-sized motor which prevents run-out of a rotor and generation of noise even when the perpendicularity of a bearing and a bush relative to a motor shaft deteriorates slightly, as well as a method of manufacturing such a small-sized motor.

Another object of the present invention is to decrease the end play and the clearance between the bearing and the bush, without use of a special washer such as a wave washer or an adjustment washer and without necessity of decreasing the tolerance of each part to an extreme extent, to thereby reduce cost.

Still another object of the present invention is to prevent the motor shaft from generating noise by hitting the bearing in the radial direction, which noise generation would otherwise occur when the alignment between two bearing at the opposite ends of the motor shaft deteriorates.

Yet another object of the present invention is to enable of accurate attachment of a ball bearing without use of an expensive part such as a bearing attachment member made of metal.

A small-sized motor of the present invention has a cylindrical bearing support portion 2 projecting from an end surface of a motor casing 1 made of a metal. A generally cylindrical bearing 4 is accommodated within the bearing support portion 2. The bearing 4 has at its center a through hole into which a motor shaft 5 is inserted. The bearing 4 has an outer diameter smaller than the inner diameter of the bearing support portion 2 such that a clearance is formed between the bearing 4 and the bearing support portion 2. At an approximate center of the bearing 4 with respect to the thrust direction, a projection 19 is continuously or non-continuously formed on the inner circumferential surface of the bearing support portion 2 along a circular line centered on the motor shaft. Further, a depression 20 is continuously or non-continuously formed on the outer circumferential surface of the bearing 4 along the circular line such that the depression 20 corresponds to the projection 19. Thus, the bearing 4 is supported within the bearing support portion 2 in such a manner that thrust movement is prevented, but slight tilting about the projection 19 is permitted.

A method of manufacturing a small-sized motor according to the present invention is characterized by comprising the steps of preparing a generally cylindrical bearing 4 having at its center a through hole into which a motor shaft 5 is inserted, the bearing 4 having an outer diameter smaller than the inner diameter of the bearing support portion 2; placing the bearing 4 in the bearing support portion 2 such that a clearance is formed between the bearing 4 and the bearing support portion 2; assembling components, including the motor casing 1 accommodating the bearing 4 therein, into a small-sized motor; and pressing, by use of a pressing jig 21 (FIG. 4) or a pressing jig 22 (FIG. 5), the outer circumferential surface of the bearing support portion 2 from the radially outward direction at an approximate center of the bearing 4 with respect to the thrust direction, while applying a predetermined thrust force to the bearing 4, such that pressing force is applied to the bearing support portion 2 along a circular line centered on the motor shaft in order to continuously or non-continuously form a projection 19 on the inner circumferential surface of the bearing support portion 2 and a depression 20 on the outer circumferential surface of the bearing 4 such that the depression 20 corresponds to the projection 19. Thus, the end play and the clearance between the bearing 4 and the bush 17 can be decreased with ease.

In the method of manufacturing a small-sized motor according to the present invention, the motor casing 1 is preferably formed of a metal causing a larger degree of springback than does the material of the bearing 4. Thus, a slight clearance is formed between the bearing 4 and the bearing support portion 2 to thereby permit tilting of the bearing 4.

The present invention can be applied to a small-sized motor utilizing a ball bearing 3, as well as to a method of manufacturing such a small-sized motor. In this case, a spacer 6 for holding the ball bearing 3 is provided within the bearing support portion 2; and at an approximate center of the spacer 6 with respect to the thrust direction, a projection 19 is formed on the inner circumferential surface of the bearing support portion 2, and a depression 20 corresponding to the projection 19 is formed on the outer circumferential surface of the spacer 6, such that the projection 19 and the depression 20 extend continuously or non-continuously along a circular line centered on the motor shaft.

BEST MODE FOR CARRYING OUT THE INVENTION

Figure 1:
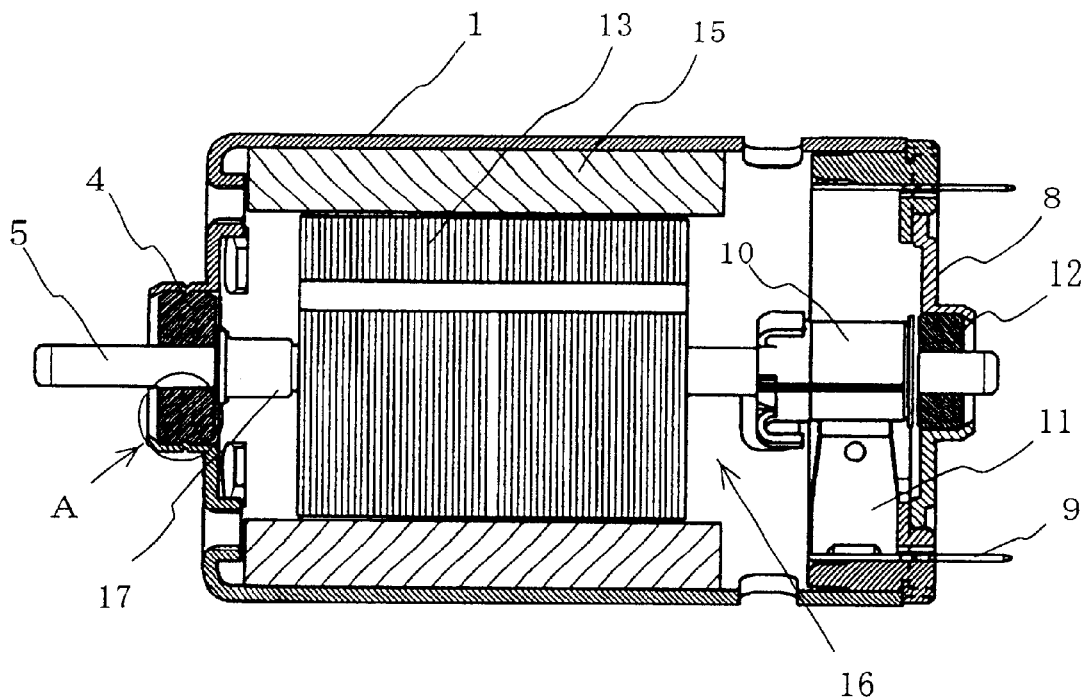
FIG. 1 is a schematic longitudinal sectional view of a small-sized motor according to a first embodiment of the present invention.
Figure 2:
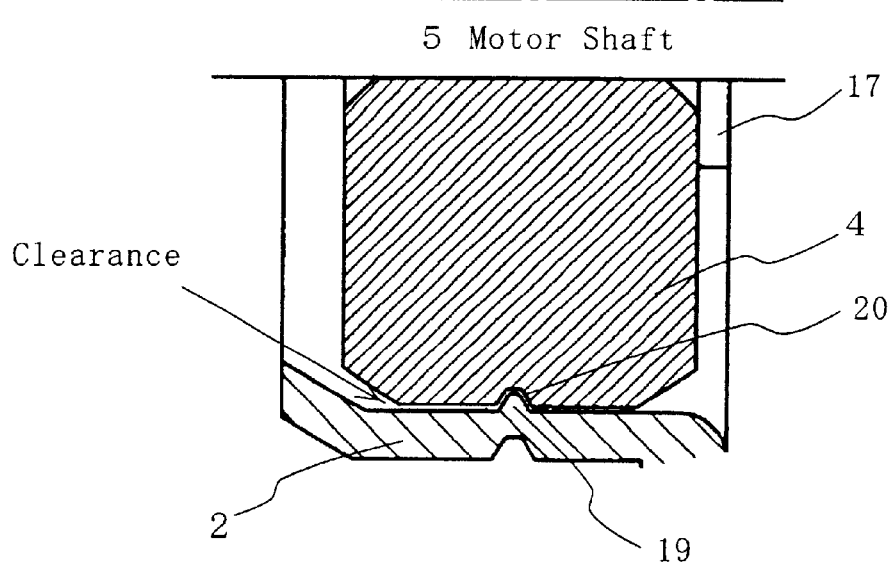
FIG. 2 is a view showing in detail a portion A of the bearing shown in FIG. 1.

FIG. 1 is a longitudinal sectional view of a small-sized motor according to a first embodiment of the present invention. The small-sized motor has a conventional structure, except for the structure of a bearing 4. As shown in FIG. 2, which shows a portion A in detail, the bearing 4 is a slide bearing. In FIG. 1, reference numeral 1 denotes a motor casing, which is formed of a metallic material into a closed-bottomed cylindrical shape. Permanent magnets 15 serving as stator magnet poles (two poles in the illustrated example) are attached to the inner surface of the motor casing 1, and a cylindrical projection for receiving the bearing 4; i.e., a bearing support portion, is formed integrally with the motor casing 1 to be located at the center of the bottom portion. A casing cover 8 formed of a metal is fitted into the opening of the motor casing 1. At the center of the casing cover 8 is provided a support portion into which a bearing 12 is press-fitted in a conventional manner. Brushes 11 and terminals 9 connected thereto are attached to the casing cover 8 via a holder formed of a resin. A core 13, a winding (not shown), and a commutator 10 are attached to a motor shaft 5 to thereby constitute a rotor 16. In FIG. 1, reference numeral 17 denotes a bush formed of a resin or metal and adapted to axially position the rotor 16.

The structure of the bearing 4, which is a feature of the present invention, will next be described with reference to FIGS. 2 and 3. As shown in FIG. 2, the bearing 4 formed of a sintered alloy is accommodated in a cylindrical bearing support portion 2, which is formed integrally with the motor casing 1 to be located at the center of the bottom portion. The bush 17 is supported by the bearing 4 in the thrust direction. The bush 17 itself is an ordinary one and is fixed to the motor shaft 5. A thrust washer may be disposed in place of the bush 17. In either case, the bearing 4 supports the motor shaft 5 in the thrust direction. A conventional technique utilizes an adjustment washer which comes into contact with at least one of the bearings 4 and 12 in the thrust direction to thereby minimize end play. By contrast, the present invention does not require any adjustment washer for adjusting end play. However, there may be used an oil stopper washer for preventing leakage of oil charged in pores of the bearing formed of a sintered alloy, or a thrust washer for preventing direct contact between the bush and the bearing. Since these washers do not require adjustment in thickness or number, provision of these washers does not increase cost as compared with the case of adjustment washers.

Figure 8:
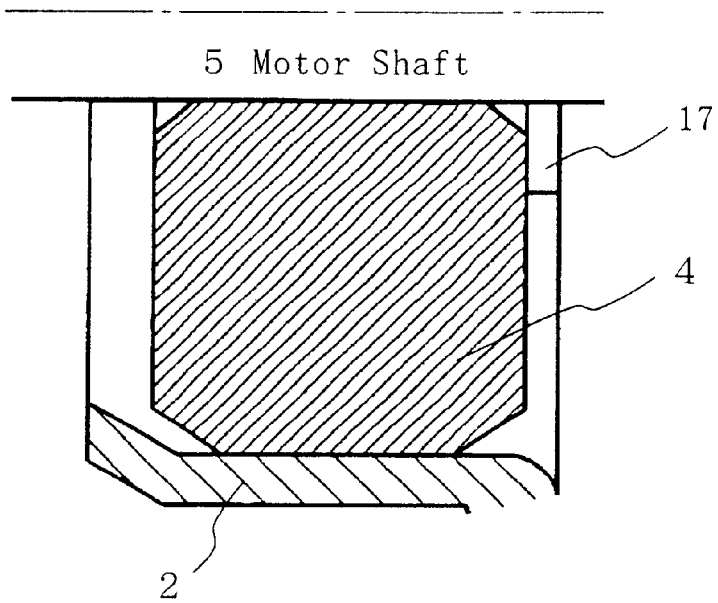
FIG. 8 is a view showing the structure of another conventional bearing.

In contrast to the conventional bearing 4 shown in FIG. 8, which is press-fitted into the bearing support portion 2, the bearing 4 shown in FIG. 2 is placed in the bearing support portion 2 such that a clearance is formed between the outer circumferential surface of the bearing 4 and the inner circumferential surface of the bearing support portion 2. The bearing 4 has a generally cylindrical shape and has at its center a through hole into which a motor shaft 5 is inserted.

The bearing 4 has an outer diameter smaller than the inner diameter of the bearing support portion 2. After insertion of the bearing 4, a projection 19 is formed on the inner circumferential surface of the bearing support portion 2 such that the projection 19 extends continuously or non-continuously along a circular line centered on the motor shaft, and a depression 20 corresponding to the projection 19 is formed to extend continuously on the outer circumferential surface of the bearing 4 along the circle. Thus, the bearing 4 is fixedly held within the interior of the bearing support portion 2.

Figure 3:
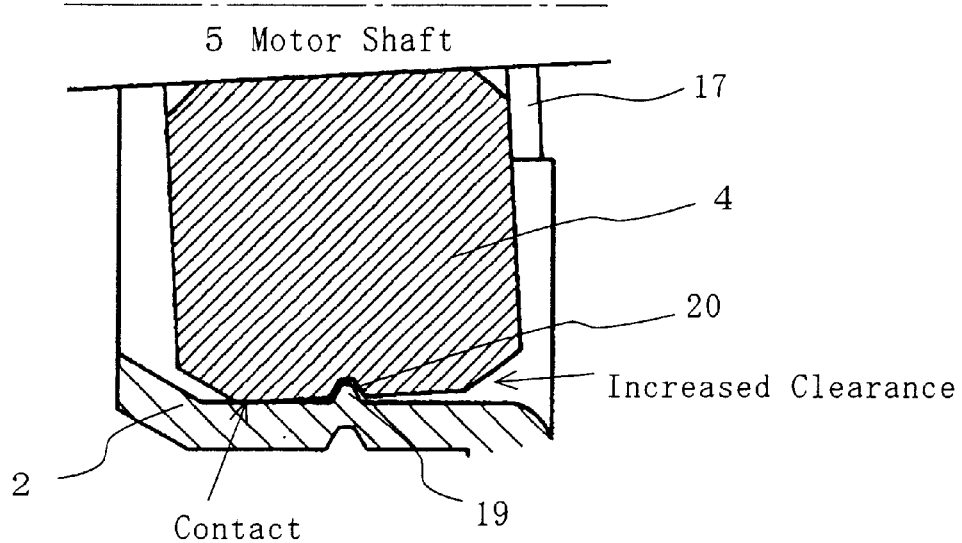
FIG. 3 is a view corresponding to FIG. 2 and showing a bearing support action.

FIG. 3 is a view corresponding to FIG. 2 and showing a bearing support action. Thrust movement of the bearing 4 is prevented by the projection 19 and the depression 20, but the bearing 4 can tilt slightly about the projection 19, because the bearing 4 is accommodated within the bearing support portion 2 such that a clearance is left outside the bearing 4. FIG. 3 shows a state in which the bearing 4 has tilted in such a direction that the clearance between the bearing 4 and the bearing support portion 2 increases on the right side in FIG. 3, and the bearing 4 comes into contact with the bearing support portion 2 on the left side in FIG. 3, so that the clearance therebetween becomes almost zero.

Figure 9:
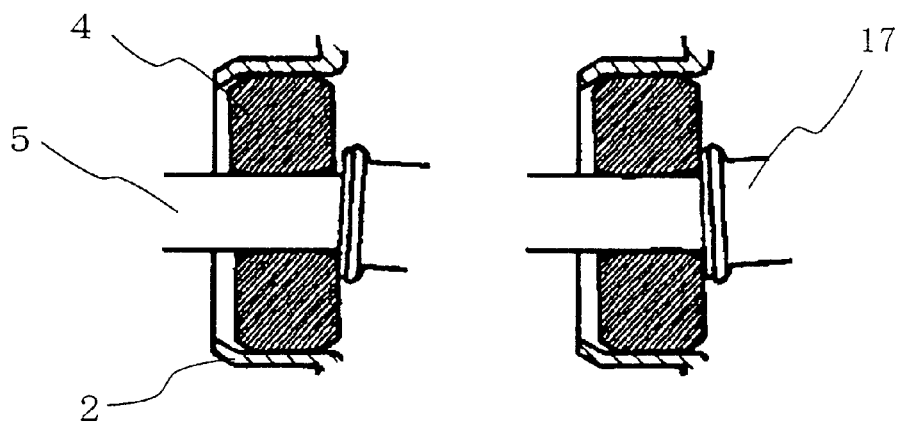
FIG. 9 is a view showing an action when the perpendicularity of a bush contact surface relative to the motor shaft has deteriorated slightly.

By virtue of the above-described structure, when the perpendicularity of the bearing 4 and the bush 17 relative to the motor shaft deteriorates slightly as described with reference to FIG. 9, the bearing 4 tilts about the projection 19, so that the surface contact between the end surface of the bush 17 and the end surface of the bearing 4 is always maintained (automatic alignment function). Accordingly, the small-sized motor according to the present invention does not suffer a problem in that the rotor causes run-out with resultant generation of noise.

The projection 19 and the depression 20 corresponding thereto are formed after assembly of all the components into a small-sized motor. The assembly is performed in the following manner. First, one end of the motor shaft 5 of the rotor is inserted in the bearing 4, which is accommodated within the bearing support portion 2 at the center of the bottom portion of the motor casing 1 such that a clearance is formed between the bearing 4 and the bearing support portion 2. Subsequently, the casing cover 8 carrying the brushes 11 and the terminals 9 is fitted into the opening of the motor casing 1, while the other end of the motor shaft 5 is inserted into the bearing 12, which is fixed to the casing cover 8. After the assembly, the projection 19 and the depression 20 are formed in a state in which a certain thrust force is applied to the bearing 4 from the outside of the motor in the thrust direction; i.e., from the left side in FIG. 1, by use of an unillustrated spring or the like. The force applied by means of the spring or the like must not be so strong that the thrust friction of the motor shaft 5 during operation becomes excessive (force is limited to not greater than 1000 gf), and must not be so weak that the allowance for thrust movement of the motor shaft 5 (i.e., end play) becomes excessive. The above-described method of forming the projection 19 and the depression 20 while applying a proper force to the bearing 4 minimizes the end play.

Figure 4:
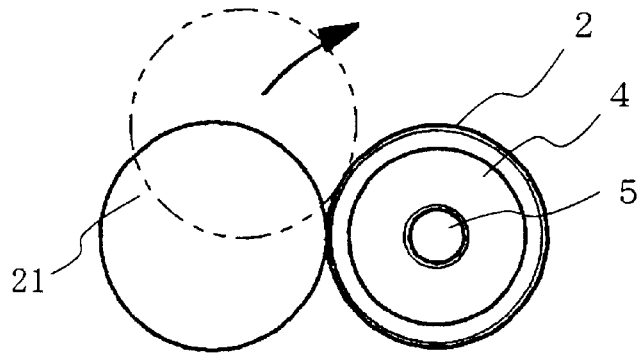
FIG. 4 is a view showing an exemplary method of forming a continuous projection on the inner circumferential surface of the bearing support portion, while forming a continuous depression on the outer circumferential surface of the bearing such that the depression corresponds to the projection.
Figure 5:
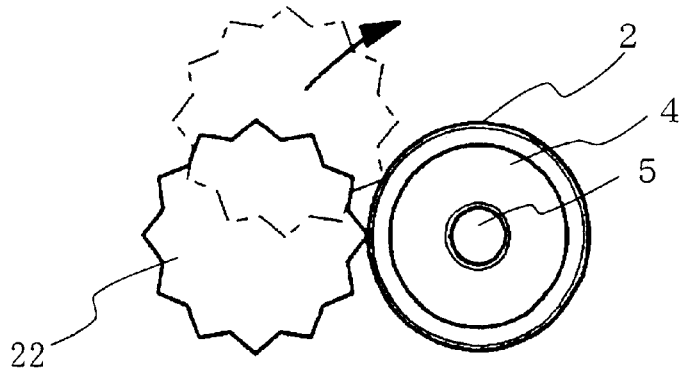
FIG. 5 is a view showing an exemplary method of forming a non-continuous projection and depression similar to those of FIG. 4.
Figure 6:
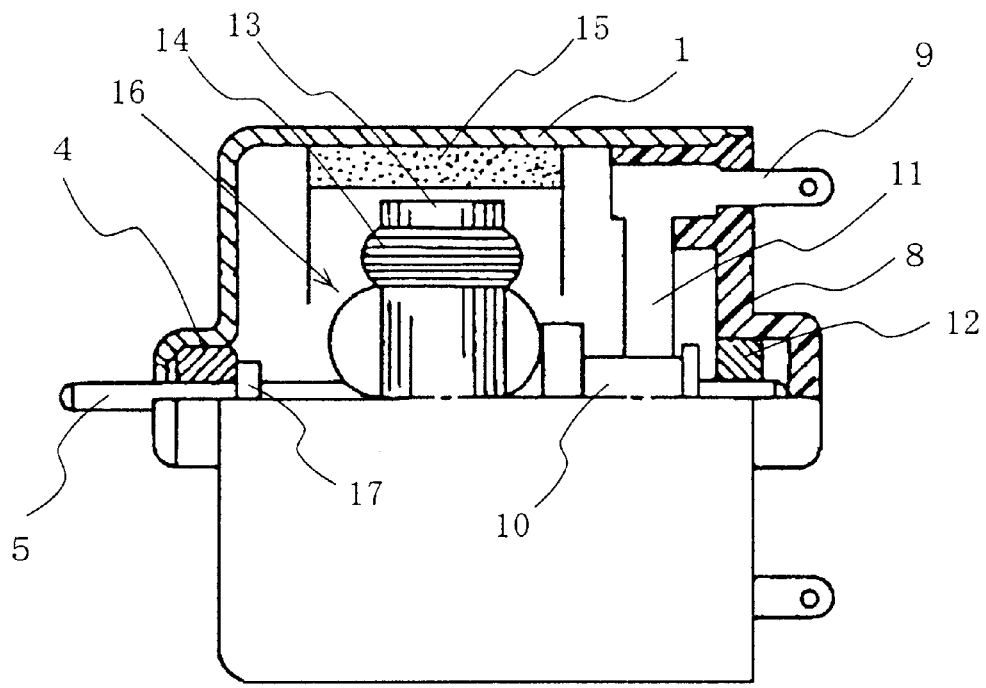
FIG. 6 is a view showing the overall structure of a conventional small-sized motor.
Figure 7:
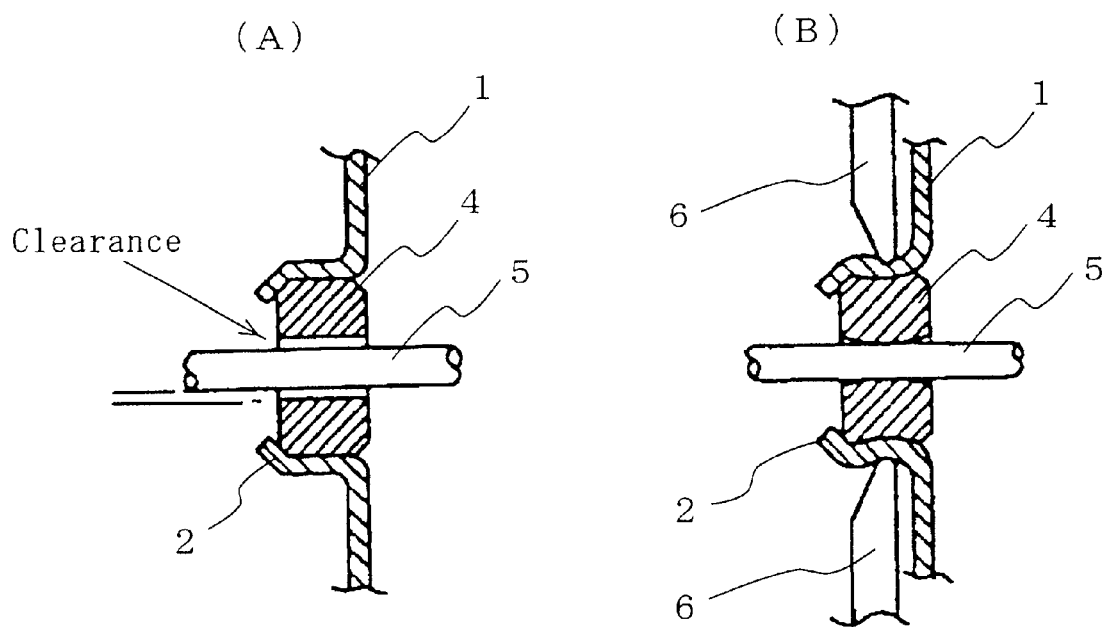
FIG. 7 is a view showing the structure of a conventional bearing.

FIGS. 4 and 5 shows an exemplary method of forming the projection 19 and the depression 20. By use of a pressing jig 21 shown in FIG. 21, a pressing force is applied to the bearing support portion 2 from the radially outward direction along a circular line centered on the center of the motor shaft 5, while a constant thrust force is applied to the bearing 4, as described previously. The pressing operation is preferably performed at a central portion of the bearing 4 with respect to the thrust direction, in order to enable tilting of the bearing 4.

Although not illustrated, during the pressing operation, rollers having a predetermined axial length may be used in order to support the bearing support portion 2 from the side opposite the side from which the pressing jig 21 presses the bearing support portion 2. The pressing jig 21 shown in FIG. 4 has a circular shape and a protrusion extending continuously in the circumferential direction of the jig 21. The protrusion has a cross-sectional shape (in the widthwise or axial direction of the jig) which corresponds to the depression formed in the outer circumferential surface of the bearing support portion 2 shown in FIG. 2. The cross-sectional shape may be any other arbitrary shape, such as a semi-circular shape or a trapezoidal shape, insofar as the combination of the projection 19 and the depression 20 can restrict thrust movement of the bearing while permitting slight tilting of the bearing. Use of the pressing jig 21 enables formation of the projection 19 and the depression 20, both continuous in the circumferential direction. Since the material of the bearing is a sintered alloy, the bearing plastically deforms due to breakage of pores. By contrast, the motor casing (bearing support portion 2) formed of a metal such as iron causes a springback of 0.01 to 0.02 mm upon removal of the pressing jig 21. Therefore, when the pressing jig 21 is removed, a slight clearance is formed between the bearing 4 and the bearing support portion 2 in order to enable slight tilting of the bearing 4. Since such a clearance is also formed at the contact portion between the projection 19 and the depression 20, the bearing can tilt even when the projection 19 and the depression 20 have a trapezoidal cross-sectional shape.

As shown in FIG. 5, there may be used a pressing jig 22 has a plurality of protrusions (triangular protrusions in the illustrated example) on the circumference. Use of the pressing jig 22 enables formation of a projection 19 and a depression 20, both non-continuous in the circumferential direction. If the bearing 4 itself rotates within the bearing support portion 2 during operation of the motor, the performance of the bearing 4 deteriorates. In ordinary cases, since there is a great difference in diameter; i.e., contact surface area, between the inner circumferential surface of the bearing 4 in contact with the motor shaft 5 and the outer circumferential surface of the bearing 4 in contact with the bearing support portion 2, the bearing 4 itself does not rotate even though a clearance is present between the bearing 4 and the bearing support portion 2. However, if the friction between the motor shaft 5 and the bearing 4 increases due to loss of oil or seizure, the bearing 4 rotates together with the motor shaft 5, resulting in deterioration in the bearing performance. Employment of the non-continuous projection 19 and the non-continuous depression 20 enables the bearing 4 to be fixedly held within the bearing support portion 2.

Figure 10:
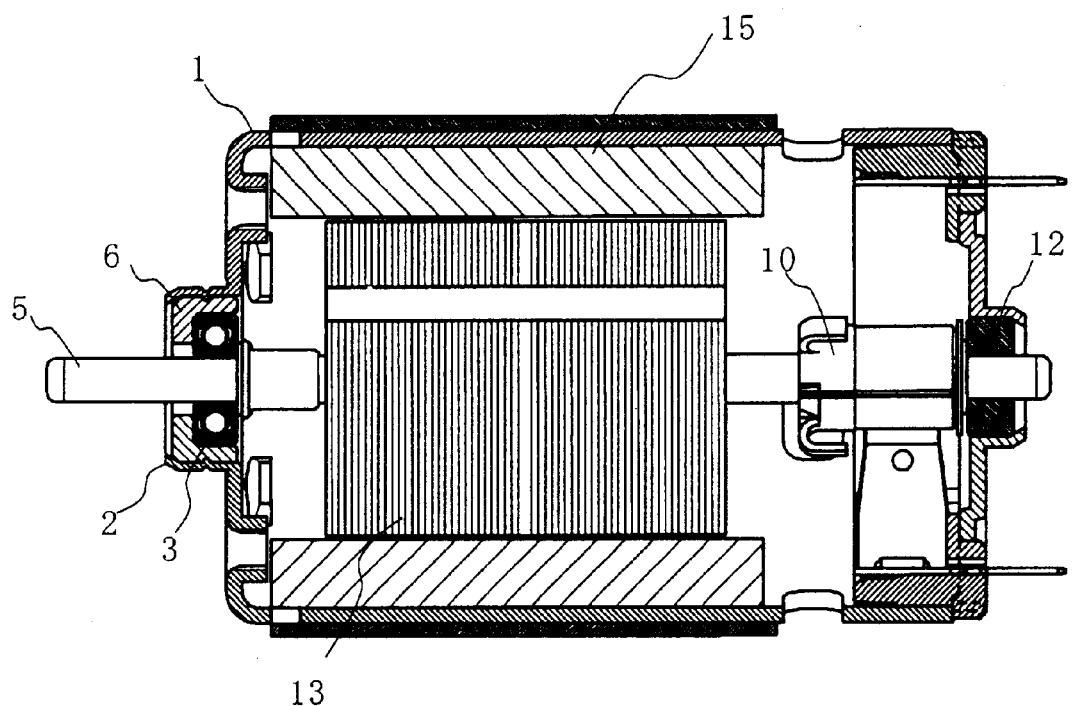
FIG. 10 is a schematic longitudinal sectional view of a small-sized motor according to a second embodiment of the present invention.
Figure 11:
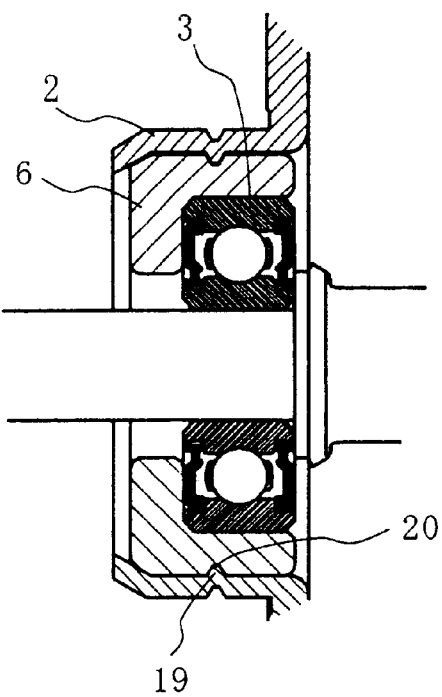
FIG. 11 is an enlarged view showing in detail the bearing portion shown in FIG. 10.
Figure 12:
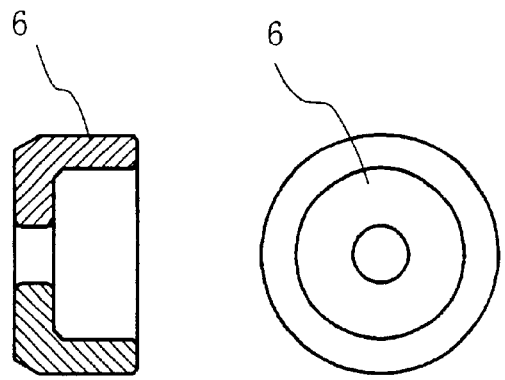
FIG. 12 is an enlarged view showing in detail the spacer shown in FIG. 11.

FIG. 10 is a schematic longitudinal sectional view of a small-sized motor according to a second embodiment of the present invention; FIG. 11 is an enlarged view showing in detail the bearing portion shown in FIG. 10; and FIG. 12 is an enlarged view showing in detail the spacer shown in FIG. 11. Since the small-sized motor of the present embodiment has a structure identical with that of the small-sized motor of the first embodiment, except for the structure of the bearing portion provided at the center of the bottom portion of the motor casing 1, detailed description of the overall structure is omitted.

As specifically shown in FIG. 11, via a spacer 6, a ball bearing 3 is disposed inside the cylindrical bearing support portion 2 integrally formed at the center of the bottom portion of the motor casing 1 made of a metal. As shown in FIG. 12, the spacer 6 is preferably formed from a material, such as sintered alloy or copper alloy or synthetic resin, which causes plastic deformation, and has a shape of a bottomed cylinder having a through-hole at the center of the bottom. Further, in order to form a clearance between the spacer and the bearing support portion, the material of the spacer is selected such that the springback of the bearing support portion or the metal motor casing becomes greater than that of the spacer.

The ball bearing 3 having a generally cylindrical overall shape is inserted into the spacer 6 from the interior of the motor, and the spacer 6 holding the ball bearing 3 is placed into the bearing support portion 2. The spacer 6 has an outer diameter smaller than the inner diameter of the bearing support portion 2. After placement of the spacer 6 into the bearing support portion 2 with a clearance formed therebetween, the spacer 6 is fixed by use of the projection 19 formed on the bearing support portion 2 and the depression formed on the spacer 6.

At a substantially central portion of the spacer 6 in the thrust direction, the projection 19 is continuously or non-continuously formed on the inner circumferential surface of the bearing support portion along a circular line centered on the motor shaft, and the depression 20 is continuously or non-continuously formed on the outer circumferential surface of the spacer 6 along the circular line such that the depression 20 corresponds to the projection 19.

Figure 13:
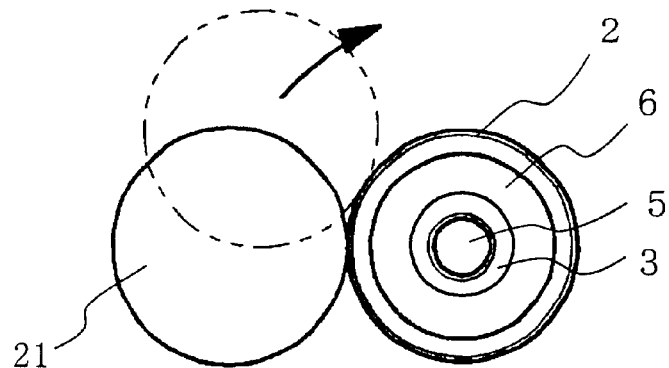
FIG. 13 is a view showing an exemplary method of forming a continuous projection on the inner circumferential surface of the bearing support portion shown in FIG. 11, while forming a continuous depression on the outer circumferential surface of the bearing such that the depression corresponds to the projection.
Figure 14:
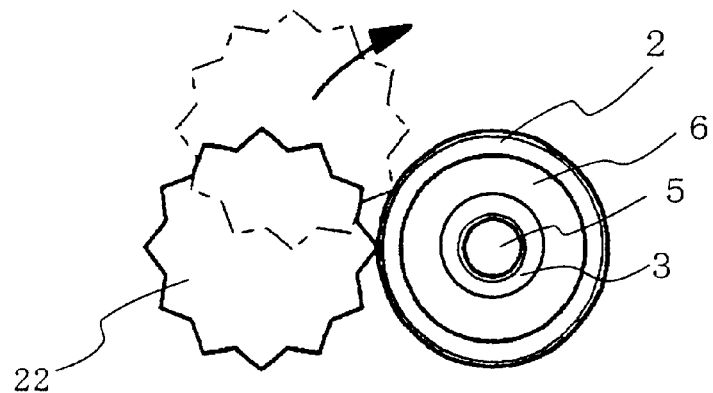
FIG. 14 is a view showing an exemplary method of forming a non-continuous projection and depression similar to those of FIG. 13.
Figure 15:
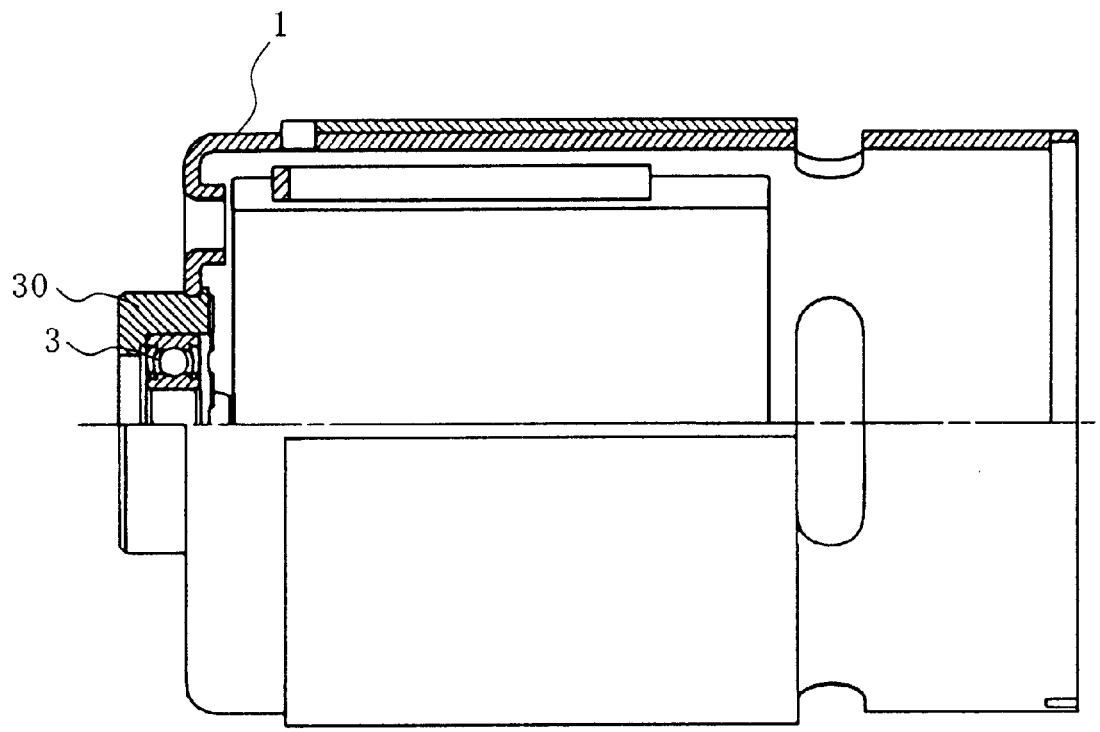
FIG. 15 is a partially sectioned side view of a conventional small-sized motor with the rotor and casing cover being removed.
Figure 16:
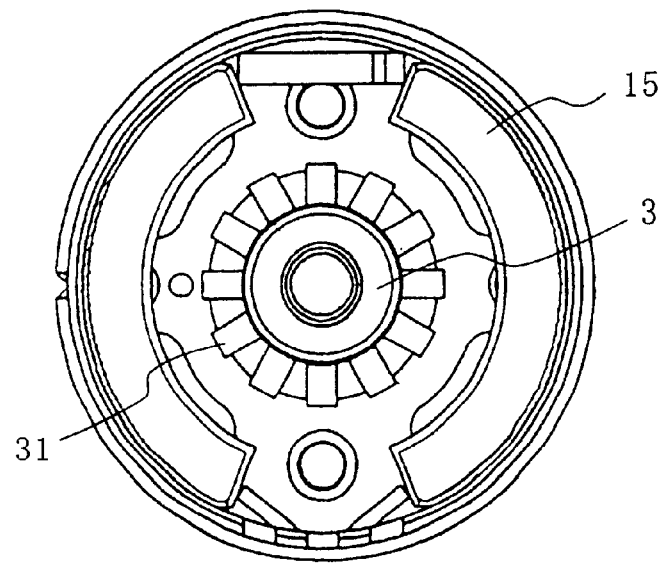
FIG. 16 is a view of the small-sized motor of FIG. 15 as viewed from the interior of the motor toward the bearing portion.

The projection 19 and the depression 20 corresponding thereto are formed after assembly of all the components into a small-sized motor. FIGS. 13 and 14 each show an exemplary method of forming the continuous or non-continuous projection 19 and the depression 20. Since these methods are basically the same as those described with reference to FIGS. 4 and 5, the methods are not described in detail.

After the assembly, in a state in which a predetermined thrust force is applied to the spacer 6 from the outside of the motor in the thrust direction by use of an unillustrated spring or the like, a pressing jig 21 shown in FIG. 13 is caused to apply a pressing force to the bearing support portion 2 from the radially outward direction along a circular line centered on the center of the motor shaft 5, so that the projection 19 and the depression 20 are formed simultaneously under application of proper force. Thus, the structure shown in FIGS. 10 and 11 has an automatic alignment function and minimizes end play. Therefore, washers for automatic alignment function or elimination of end play are not required.

Industrial Applicability

As described above, in the small-sized motor according to the present invention, the bearing has an outer diameter smaller than the inner diameter of the bearing support portion, and the bearing is accommodated within the bearing support portion such that a clearance is formed therebetween. Further, the projection provided on the inner circumferential surface of the bearing and the depression formed on the outer circumferential surface of the bearing to correspond to the projection cooperate to thereby restrict thrust movement of the bearing, while permitting slight tilting of the bearing. Therefore, run-out of a rotor and generation of noise do not occur even when the perpendicularity of the bearing and the bush relative to the motor shaft deteriorates slightly. Further, even when the alignment between two bearing at the opposite ends of the motor shaft deteriorates, the motor shaft does not generate noise by hitting the bearing in the radial direction.

Moreover, such projection and depression can be formed in a state in which a constant thrust force is applied to the bearing from the outside of the motor, the clearance between the bearing and the bush can be decreased with ease, and end play can be decreased with ease. Therefore, use of a special washer such as a wave washer or an adjustment washer is not required, nor is the tolerance of each part required to decrease excessively, so that cost can be reduced. Further, since the end play decreases, the projection of the motor shaft to the outside of the motor becomes constant, because the projection is not affected by the end play.

Further, when the present invention is applied to a small-sized motor having a ball bearing, it becomes unnecessary to use an expensive part such as a bearing attachment 30 manufactured independent of the motor casing. In general, the bearing support portion is formed to have a size suitable for attachment to a client's apparatus. When the client's apparatus varies from model to model, the expensive bearing attachment must be replaced, resulting in increased cost. By contrast, the small-sized motor of the present invention can cope with such a model change through replacement of inexpensive spacers, without replacement of the ball bearings with bearings of a different size.

What is claimed is:

1. A small-sized motor having a cylindrical bearing support portion projecting from an end surface of a motor casing made of a metal, the motor comprising:

a generally cylindrical bearing accommodated within the bearing support portion, the bearing having at its center a through hole into which a motor shaft is inserted, and having an outer diameter smaller than the inner diameter of the bearing support portion such that a clearance is formed between the bearing and the bearing support portion; and a projection formed on the inner circumferential surface of the bearing support portion and a depression corresponding to the projection formed on the outer circumferential surface of the bearing, at an approximate center of the bearing with respect to the thrust direction, the projection and the depression extending continuously or non-continuously along a circular line centered on the motor shaft.

2. A method of manufacturing a small-sized motor having a cylindrical bearing support portion projecting from an end surface of a motor casing made of a metal, the method comprising:

preparing a generally cylindrical bearing having at its center a through hole into which a motor shaft is inserted, the bearing having an outer diameter smaller than the inner diameter of the bearing support portion;

placing the bearing in the bearing support portion such that a clearance is formed between the bearing and the bearing support portion;

assembling components, including the motor casing accommodating the bearing therein, into a small-sized motor; and pressing, by use of a pressing jig, the outer circumferential surface of the bearing support portion from the radially outward direction at an approximate center of the bearing with respect to the thrust direction, while applying a predetermined thrust force to the bearing, such that pressing force is applied to the bearing support portion along a circular line centered on the motor shaft in order to continuously or non-continuously form a projection on the inner circumferential surface of the bearing support portion and a depression on the outer circumferential surface of the bearing such that the depression corresponds to the projection.

3. A method of manufacturing a small-sized motor according to claim 2, wherein the motor casing is formed of a metal causing a larger degree of springback than does the material of the bearing.

4. A small-sized motor having a cylindrical bearing support portion projecting from an end surface of a motor casing made of a metal, the motor comprising:

a spacer for holding a ball bearing provided within the bearing support portion; and a projection formed on the inner circumferential surface of the bearing support portion and a depression corresponding to the projection formed on the outer circumferential surface of the spacer, at an approximate center of the spacer with respect to the thrust direction, the projection and the depression extending continuously or non-continuously along a circular line centered on the motor shaft.

5. A small-sized motor according to claim 4, wherein the spacer is formed of a sintered metal.

6. A method of manufacturing a small-sized motor having a cylindrical bearing support portion projecting from an end surface of a motor casing made of a metal, the method comprising:

preparing a spacer having an outer diameter smaller than the inner diameter of the bearing support portion and adapted to hold a ball bearing therein;

placing the spacer in the bearing support portion such that a clearance is formed between the spacer and the bearing support portion;

assembling components, including the motor casing accommodating the bearing therein, into a small-sized motor; and pressing, by use of a pressing jig, the outer circumferential surface of the bearing support portion from the radially outward direction at an approximate center of the spacer with respect to the thrust direction, while applying a predetermined thrust force to the spacer, such that pressing force is applied to the bearing support portion along a circular line centered on the motor shaft in order to continuously or non-continuously form a projection on the inner circumferential surface of the bearing support portion and a depression on the outer circumferential surface of the spacer such that the depression corresponds to the projection.

* * * * *